US009291410B2

(12) United States Patent
Nilsson

(10) Patent No.: US 9,291,410 B2
(45) Date of Patent: Mar. 22, 2016

(54) COOLING DEVICE FOR COOLING COMBUSTION GASES FROM RECOILLESS ANTI-TANK WEAPONS

(75) Inventor: Lars Nilsson, Torshälla (SE)

(73) Assignee: SAAB AB, Linköping (SE)

(*) Notice: Subject to any disclaimer, the term of this patent is extended or adjusted under 35 U.S.C. 154(b) by 561 days.

(21) Appl. No.: 13/811,036

(22) PCT Filed: Jul. 22, 2010

(86) PCT No.: PCT/SE2010/000196
§ 371 (c)(1),
(2), (4) Date: Mar. 15, 2013

(87) PCT Pub. No.: WO2012/011853
PCT Pub. Date: Jan. 26, 2012

(65) Prior Publication Data
US 2013/0160427 A1  Jun. 27, 2013

(51) Int. Cl.
| F02K 11/00 | (2006.01) |
| F41A 1/10 | (2006.01) |
| F02K 9/40 | (2006.01) |
| F02K 9/97 | (2006.01) |
| F41A 13/00 | (2006.01) |
| F41A 13/04 | (2006.01) |

(52) U.S. Cl.
CPC ... *F41A 1/10* (2013.01); *F02K 9/40* (2013.01); *F02K 9/972* (2013.01); *F41A 13/00* (2013.01); *F41A 13/04* (2013.01)

(58) Field of Classification Search
CPC .......... F41A 1/10; F41A 13/00; F41A 13/04; F02K 9/40; F02K 9/972

USPC .................................................. 60/266, 267
See application file for complete search history.

(56) References Cited

U.S. PATENT DOCUMENTS

| 2,522,113 A | 9/1950 | Goddard |
| 2,544,422 A | 3/1951 | Goddard et all |
| 2,916,873 A | 12/1959 | Walker |
| 3,036,430 A | 5/1962 | Eggers et al. |
| 3,197,959 A | 8/1965 | Keller |

(Continued)

FOREIGN PATENT DOCUMENTS

| GB | 2005606 A | 4/1979 |
| JP | 01277666 A | 11/1989 |

(Continued)

*Primary Examiner* — Ching Chang
(74) *Attorney, Agent, or Firm* — Novak Druce Connolly Bove + Quigg LLP

(57) ABSTRACT

The present invention relates to a cooling device (2) for cooling combustion gases from a rocket motor (1) in an antitank weapon. The cooling device (2) comprises a coolant reservoir (3, 21) containing a coolant (4). The coolant reservoir (3, 21) is arranged such that the coolant (4) is transferred from the coolant reservoir (3, 21) to the combustion gases in the gas outlets (6) of the rocket motor (1) in response to a pressure increase in the rocket motor (1). The coolant reservoir (3, 21) constitutes an integral part of the rocket motor (1) and is connected to the combustion chamber (7) by at least two gas inlets (8) for pressurization of the coolant (4). The coolant reservoir is furthermore connected to the rocket motor nozzle (9) by at least two coolant outlets (10) for transfer of coolant (4) from the coolant reservoir (3, 21) to the rocket motor nozzle (9).

20 Claims, 2 Drawing Sheets

(56) References Cited

Figure 1:
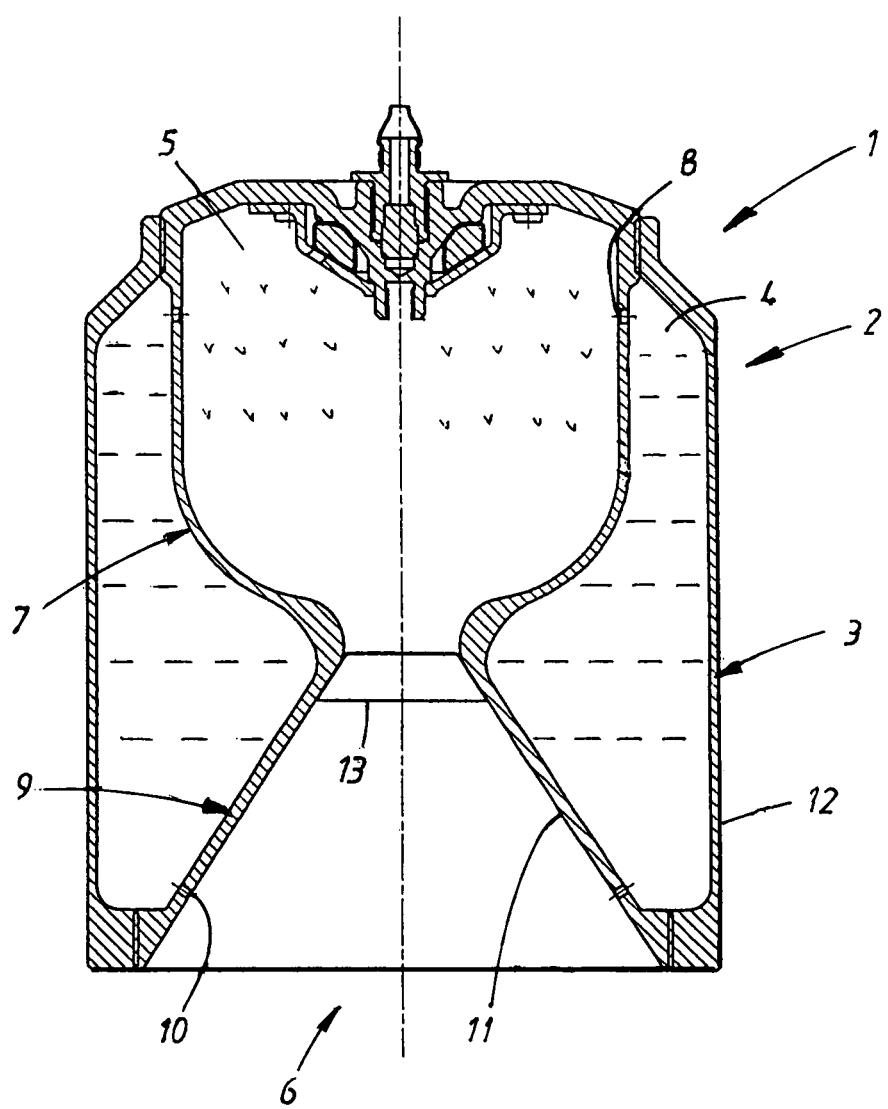

U.S. PATENT DOCUMENTS 3,230,701 A * 1/1966 Mullen, II ................. 60/207
3,305,178 A    2/1967 Parilla

FOREIGN PATENT DOCUMENTS

| RU | 2112203 C1 | 5/1998 |
|----|------------|--------|
| RU | 2259495 C2 | 8/2005 |

* cited by examiner

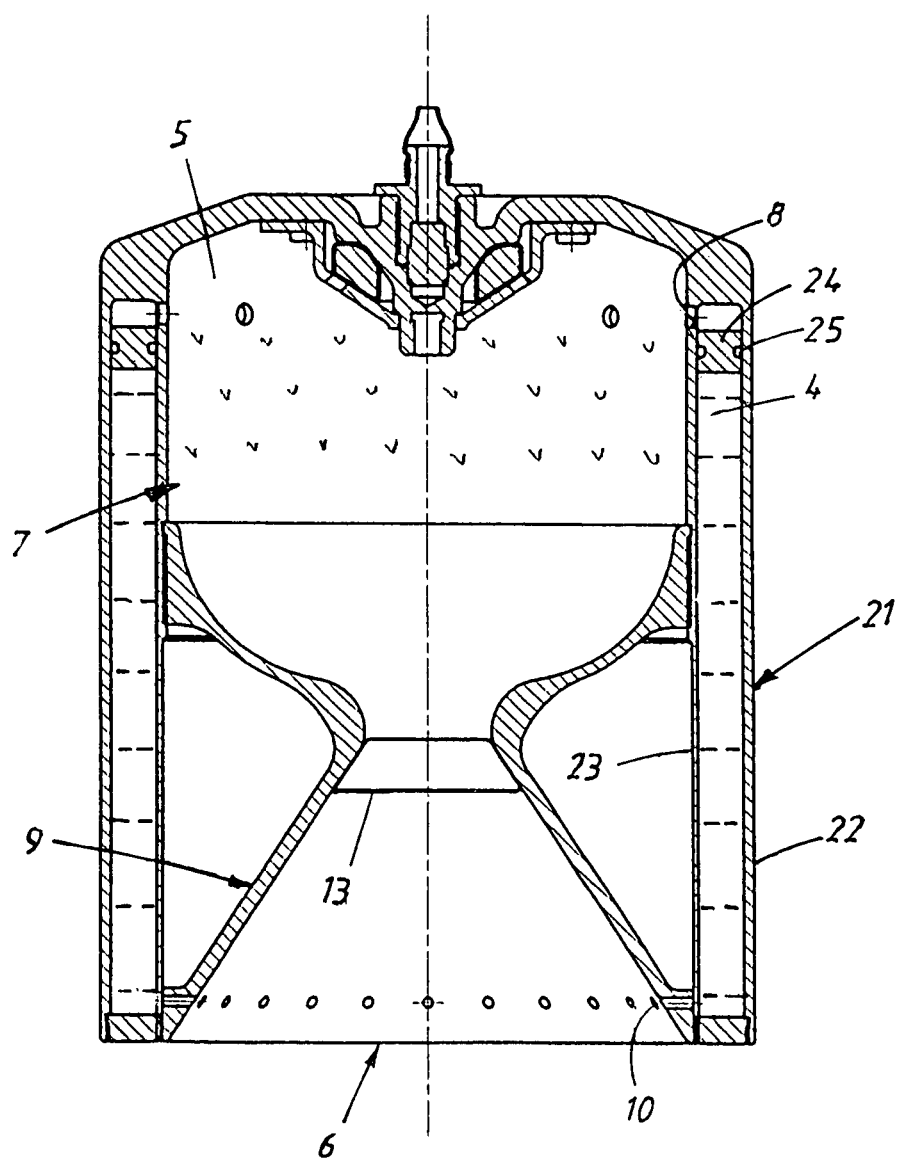

COOLING DEVICE FOR COOLING COMBUSTION GASES FROM RECOILLESS ANTI-TANK WEAPONS

CROSS REFERENCE TO RELATED APPLICATIONS

This application is a National Phase filing under 35 U.S.C. §371 of PCT/SE2010/000196 filed on Jul. 22, 2010; the entire contents of which are hereby incorporated by reference.

The present invention relates to a cooling device for cooling gunpowder gases from recoilless anti-tank weapons for reducing the sound pressure of the weapon. The invention is especially intended for anti-tank weapons of the hand-held bazooka type, which are fired from tight/restricted spaces in which high sound pressure levels are generated.

BACKGROUND

One problem with current hand-held recoilless bazooka-type weapons when fired in tight spaces is the high sound pressure levels which are generated around the weapon as an effect of the expansion of the combustion gases and the reinforcing effect given by tight spaces. High sound pressure levels adversely affect the firer of the weapon, resulting, inter alia, in impaired firing capability. High sound pressure levels can also cause damage to the firer. One way of reducing the sound pressure is to cool the combustion gases.

Known solutions for cooling of combustion gases relate to rocket weapons in which the barrel is used as the combustion chamber, wherein a reservoir containing coolant is arranged behind the propellent powder charge in the barrel. A pressure increase in the barrel caused by the propellent powder charge leads to an explosive opening of the coolant reservoir, whereupon the coolant, usually water, mixes with the combustion gases more or less instantaneously.

The process takes place initially, during the first part of the combustion process, which means that further cooling during the later part of the combustion process is not possible.

Object Of The Invention And Its Distinguishing Features

A main object of the present invention is a cooling device which allows controlled cooling of combustion gases from a rocket motor during the whole or parts of the combustion process of the rocket motor for controlled lowering of the sound pressure, especially in tight spaces.

A further object of the present invention is a simplified cooling device having few parts which do not need to be handled separately.

Said objects, as well as other objects which are not listed here, are satisfactorily met by virtue of that which is stated in the present independent patent claims. Embodiments of the invention are defined in the dependent patent claims.

Thus, according to the present invention, a cooling device for cooling combustion gases from a rocket motor in an anti-tank weapon has been provided, preferably of the hand-held recoilless rocket weapon type for firing of a rocket/projectile in tight spaces in which harmful sound pressure is generated, which cooling device comprises a coolant reservoir containing a coolant, arranged such that the coolant, in response to a pressure increase in the rocket motor upon firing of a propellent powder charge, is transferred from the coolant reservoir to the combustion gases in the outlets of the rocket motor.

The cooling device is characterized in that the coolant reservoir constitutes an integral part of the rocket motor, the coolant reservoir being connected by at least two gas inlets to a combustion chamber arranged in the rocket motor, for pressurization of the coolant, and by at least two coolant outlets to a rocket motor nozzle disposed in the rocket motor, for transfer of coolant from the coolant reservoir to the rocket motor nozzle during the whole or parts of the combustion process in the combustion chamber.

According to further aspects of the cooling device, it is the case according to the invention:

that the coolant reservoir comprises an outer wall in the form of a casing arranged coaxially to the combustion chamber and the rocket motor nozzle, the combustion chamber and the rocket motor nozzle being configured as a unit having a common outer wall, which constitutes the inner wall of the coolant reservoir, and that the casing of the coolant reservoir is fixed to the front and to the rear part of the common outer wall of the combustion chamber and of the rocket motor nozzle, that the coolant reservoir constitutes a jacketed cylinder comprising an outer wall and an inner wall and arranged coaxially to the combustion chamber and the rocket motor nozzle, the inner wall forming a partition wall against the combustion chamber and the rocket motor nozzle, that the gas inlets to the coolant reservoir are constituted by at least two circular holes arranged in the front part of the inner wall of the coolant reservoir, and that the coolant outlets to the outlet nozzle are constituted by at least two circular holes arranged in the rear part of the inner wall of the coolant reservoir, that one or more of the gas inlets comprises a rupture disc dimensioned to burst in the event of a pressure which is lower than the tamping pressure for the rocket motor, that the coolant reservoir comprises a gas-driven piston for regulating the coolant flow from the coolant reservoir to the outlet nozzle, that the piston comprises sealing rings for forming a gas seal between the piston and the inner wall of the coolant reservoir, that the coolant is liquid and comprises an anti-freeze agent.

Advantages and Effects of the Invention

The invention implies a number of advantages and effects:

By virtue of the fact that coolant can be supplied to the combustion gases throughout the combustion process, an equalization of the barrel pressure is achieved, which means that transients are avoided. The barrel can thus be dimensioned for a lower maximum pressure, which implies a weight saving.

The cooling device constitutes an integral part of the rocket motor and outlet nozzle of the weapon, which means that the mixing of the coolant into the combustion gases of the rocket motor is independent of the position of the rocket motor in the barrel.

The quantity of coolant can easily be adapted to the whole or parts of the combustion process of the powder charge.

The physical mix position of the coolant into the combustion gases can be controlled by changing the position of the gas outlets in the nozzle wall.

The coolant mix into the combustion gases can also be controlled by pressure regulation via a gas-driven piston and/or via valves, for example, rupture discs, in the gas outlets.

Coolant mixes into the combustion gases can finally be controlled by adaptive pressure regulation via sensors which, for example, detect the pressure in the combustion chamber.

As a result of the said measures, the safe distance behind the weapon can be reduced.

Further advantages and effects of the invention will emerge from a study and consideration of the following, detailed description of the invention with simultaneous reference to the drawing figures, in which:

FIG. 1 shows schematically a longitudinal section of a cooling device arranged in a rocket motor, FIG. 2 shows schematically a longitudinal section of a cooling device of alternative design.

DETAILED DESCRIPTION OF EMBODIMENTS

FIGS. 1 and 2 show two embodiments of a cooling device 2, 20 according to the invention. The cooling device 2, 20 is especially suited for use in anti-tank weapons of the hand-held bazooka type, which are fired in tight spaces in which high sound pressure levels are formed. However, the cooling device 2, 20 can in principle be used for all types of back-blowing bazooka-type weapons in which rockets/projectiles comprising a rocket motor 1 with combustion chamber 7 and rocket motor nozzle 9 are used.

The cooling device 2 in FIG. 1 comprises a coolant reservoir 3 having an outer wall 12 in the form of a casing arranged as an integral part of the rocket motor 1. The coolant reservoir 3 is arranged coaxially to the combustion chamber 7 and rocket motor nozzle 9 of the rocket motor 1, the outer wall 12 of the coolant reservoir 3 also constituting the outer wall of the rocket motor 1. The combustion chamber 7 and the rocket motor nozzle 9 constitute an integrated unit, having a common outer wall 11 which constitutes a partition wall against the coolant reservoir 3. The front part of the outer wall 12 of the coolant reservoir 3 is fixed to the front part of the common outer wall 11 of the combustion chamber 7 and of the rocket motor nozzle 9, preferably with a welded joint, screw joint or threaded joint.

Correspondingly, the rear part of the outer wall 12 of the coolant reservoir 3 is fixed to the rear part of the common outer wall 11 of the combustion chamber 7 and of the rocket motor nozzle 9, preferably with a welded joint, screw joint or threaded joint.

The coolant reservoir 3 comprises a coolant 4, which, preferably, comprises water. The coolant 4 also comprises one or more substances, for lowering the freezing temperature of the coolant 4, for example glycol and sodium chloride. Other types of known coolants can also be used. The coolant 4 can also be in gel form.

In the front part of the partition wall are arranged at least two gas inlets 8, so that combustion gas, from a propellent powder charge 5 disposed in the combustion chamber 7, in response to a pressure increase from the propellent charge 5, can flow into the coolant reservoir 3 for pressurization of the coolant 4.

The number of gas inlets 8 to the coolant reservoir 5 is at least 2 and preferably 5-10. Furthermore, the gas inlets 8 are configured with circular cross section and are distributed concentrically around the partition wall 11.

Correspondingly, at least two coolant outlets 10 are arranged in the rear part of the partition wall 11, through which the pressurized coolant 4 can be transferred from the coolant reservoir 3 to the gas outlets 6 of the rocket motor nozzle 7 for cooling of the combustion gases.

The gas inlets 8, the coolant reservoir 3 and the coolant outlets 9 form a by-pass from the combustion chamber 3 to the outlets of the rocket motor nozzle 7. The number of coolant outlets 9 is at least 2 and preferably 5-10. The coolant outlets 10 are further preferably configured with circular cross section and are evenly distributed concentrically around the partition wall 11.

The gas inlets 8 and the coolant outlets 10 are configured and positioned with regard to the desired cooling profile in the rocket/the gas outlets 6 of the projectile.

In a special embodiment (not shown), one or more of the coolant outlets 10 comprise gas dispersion nozzles for the formation of liquid mist, i.e. small liquid droplets with large specific cooling surface and hence high cooling effect.

When the weapon is fired, the propellent powder charge 5 of the rocket motor 1 is initiated, whereupon the gas pressure in the combustion chamber 7 rises rapidly to a limit value at which a nozzle plug 13 arranged in the inlet of the rocket motor nozzle 11 is released.

With this, combustion gases flow out from the rocket motor nozzle 9 at high velocity and farther out into the barrel of the weapon, at the same time as the rocket/the projectile is hurled forward in the barrel as an effect of the reaction force of the gases.

At a gas pressure which is lower than the release pressure for the nozzle plug 13, the pressurization of the coolant 4 is triggered by the flow of combustion gas into the coolant reservoir 3, via the gas inlets 8.

The pressure in the coolant reservoir 3 is regulated, preferably with the aid of one or more valves disposed in the gas inlets 8 and/or in the coolant outlets 10. The valves can be constituted, for example, by rupture discs.

Regulation with valves can also be combined with choosing different positionings of the gas inlets 8 and the coolant outlets 10 with a view to achieving optimum cooling effect during the whole or parts of the combustion process.

FIG. 2 shows an alternative embodiment of a coolant reservoir 21 according to the invention. The coolant reservoir 21 is here constituted by a jacketed cylinder having an inner wall 23 and an outer wall 22.

The jacketed cylinder 21 is arranged coaxially to the combustion chamber 7 and the rocket motor nozzle 9, the outer wall 22 of the cylinder 21 constituting the common outer wall of the rocket motor 1 and of the coolant reservoir 21, and the inner wall 23 of the cylinder 21 constituting the partition wall of the coolant reservoir 21 against the combustion chamber 7 and the rocket motor nozzle 9.

At least 2 and preferably 5-10 gas inlets 7 are arranged from the combustion chamber 7 to the coolant reservoir 21, in the front part of the inner wall 23. Furthermore, at least two and preferably 5-10 coolant outlets 7 from the coolant reservoir 33 to the rocket motor nozzle 9 are arranged in the rear part 14 of the inner wall 23.

The pressure regulation of the coolant 4 in the cooling device 20 according to FIG. 2 is managed with the aid of a gas-driven piston 24, which is movably arranged in the coolant reservoir 21. When the coolant 4 in the coolant reservoir 21 is pressurized, the piston 14 is forced backwards in the coolant reservoir 21, whereupon the coolant 4, which is arranged behind the piston 24, is forced out into the rocket motor nozzle 11 through the coolant outlets 9.

Pressure regulation with a piston 14 can be combined with rupture discs in the gas inlets, for a more reproducible pressure time setting of the coolant reservoir 21.

The invention is not limited to shown embodiments, but can be modified in various ways within the scope of the patent claims. It will be appreciated, inter alia, that the number, size, material choice and shape of the elements and components integral to the rocket motor which are of importance to the invention, for example, propellent powder, coolant, rupture disc, casing and nozzle can be adapted with regard to one another and with regard to other integral elements and components in the rocket motor, barrel and projectile/rocket of the anti-tank weapon.

The invention claimed is:

1. A cooling device for cooling combustion gases for lowering sound pressures from a rocket motor in an anti-tank weapon, which cooling device comprises a coolant reservoir containing a coolant, arranged such that the coolant, in response to a pressure increase in the rocket motor upon firing of a propellent powder charge, is transferred from the coolant reservoir to the combustion gases in gas outlets of the rocket motor, wherein the coolant reservoir is arranged coaxially to the rocket motor and to a rocket motor nozzle, constituting an integral part of the rocket motor, the coolant reservoir being connected by at least two gas inlets to a combustion chamber-arranged in the rocket motor, for pressurization of the coolant, and by at least two coolant outlets to the rocket motor nozzle disposed in the rocket motor, for transfer of coolant from the coolant reservoir to the rocket motor nozzle during the whole or parts of a combustion process in the combustion chamber.

2. The cooling device according to claim 1, wherein the coolant reservoir comprises an outer wall in the form of a casing arranged coaxially to the combustion chamber and the rocket motor nozzle, the combustion chamber and the rocket motor nozzle being configured as a unit having a common outer wall, which constitutes an inner wall of the coolant reservoir, and in that the casing of the coolant reservoir is fixed to a front and to a rear part of the common outer wall of the combustion chamber and of the rocket motor nozzle.

3. The cooling device according to claim 2 wherein the gas inlets to the coolant reservoir are constituted by at least two circular holes arranged in the front part of the inner wall of the coolant reservoir, and in that the coolant outlets to the outlet nozzle are constituted by at least two circular holes arranged in the rear part of the inner wall of the coolant reservoir.

4. The cooling device according to claim 3, wherein the coolant is liquid and comprises an anti-freeze agent.

5. The cooling device according to claim 2, wherein at least one of the gas inlets comprises a rupture disc dimensioned to burst in the event of a pressure which is lower than the tamping pressure for the rocket motor.

6. The cooling device according to claim 2, wherein the coolant is liquid and comprises an anti-freeze agent.

7. The cooling device according to claim 1, wherein the coolant reservoir constitutes a jacketed cylinder comprising an outer wall and an inner wall and arranged coaxially to the combustion chamber and the rocket motor nozzle, the inner wall forming a partition wall against the combustion chamber and the rocket motor nozzle.

8. The cooling device according to claim 7, wherein the coolant reservoir comprises a gas-driven piston for regulating flow of coolant from the coolant reservoir to the outlet nozzle.

9. The cooling device according to claim 8, the piston comprises sealing rings for forming a gas seal between the piston and the inner wall and outer wall of the coolant reservoir.

10. The cooling device according to claim 9, wherein the coolant is liquid and comprises an anti-freeze agent.

11. The cooling device according to claim 8, wherein the coolant is liquid and comprises an anti-freeze agent.

12. The cooling device according to claim 7 wherein the gas inlets to the coolant reservoir are constituted by at least two circular holes arranged in the front part of the inner wall of the coolant reservoir, and in that the coolant outlets to the outlet nozzle are constituted by at least two circular holes arranged in the rear part of the inner wall of the coolant reservoir.

13. The cooling device according to claim 12, wherein the coolant is liquid and comprises an anti-freeze agent.

14. The cooling device according to claim 7, wherein at least one of the gas inlets comprises a rupture disc dimensioned to burst in the event of a pressure which is lower than the tamping pressure for the rocket motor.

15. The cooling according to claim 7, wherein the coolant is liquid and comprises an anti-freeze agent.

16. The cooling device according to claim 1, wherein the gas inlets to the coolant reservoir are constituted by at least two circular holes arranged in a front part of the inner wall of the coolant reservoir, and in that the at least two coolant outlets to the outlet nozzle are constituted by at least two circular holes arranged in a rear part of the inner wall of the coolant reservoir.

17. The cooling device according to claim 16, wherein the coolant is liquid and comprises an anti-freeze agent.

18. The cooling device according to claim 1, wherein at least one of the gas inlets comprises a rupture disc dimensioned to burst in the event of a pressure which is lower than a tamping pressure for the rocket motor.

19. The cooling device according to claim 18, wherein the coolant is liquid and comprises an anti-freeze agent.

20. The cooling device according to claim 1, wherein the coolant is liquid and comprises an anti-freeze agent.

* * * * *